United States Patent
Wessel et al.

(10) Patent No.: US 10,127,937 B1
(45) Date of Patent: Nov. 13, 2018

(54) OPTICALLY OPAQUE OVERLAY FOR A WAVEGUIDE OF A HEAT-ASSISTED MAGNETIC RECORDING SLIDER

(71) Applicant: Seagate Technology LLC, Cupertino, CA (US)

(72) Inventors: James Gary Wessel, Savage, MN (US); Zoran Jandric, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/433,235

(22) Filed: Feb. 15, 2017

Related U.S. Application Data

(60) Provisional application No. 62/301,418, filed on Feb. 29, 2016.

(51) Int. Cl.
- G11B 11/00 (2006.01)
- G11B 5/48 (2006.01)
- G11B 5/00 (2006.01)
- G11B 5/60 (2006.01)

(52) U.S. Cl.
CPC ......... *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,400,887 B2 | 3/2013 | Iwanabe et al. | |
| 8,406,093 B2* | 3/2013 | Iwanabe | G11B 5/314 369/13.13 |
| 8,462,592 B1* | 6/2013 | Wolf | G11B 5/314 369/13.13 |
| 8,780,678 B2* | 7/2014 | Iwanabe | G11B 5/314 369/13.13 |
| 9,047,908 B2 | 6/2015 | Rawat et al. | |
| 9,087,531 B1 | 7/2015 | Yamada | |
| 9,190,100 B2 | 11/2015 | Dhawan et al. | |
| 9,286,920 B1 | 3/2016 | Hu et al. | |
| 9,311,935 B2 | 4/2016 | Clinton et al. | |
| 9,934,801 B1* | 4/2018 | Wessel | G11B 2005/002 369/13.33 |
| 2009/0052077 A1* | 2/2009 | Tanaka | G11B 5/02 369/13.33 |
| 2012/0020194 A1* | 1/2012 | Jin | G11B 5/1278 369/13.13 |

(Continued)

*Primary Examiner* — Tan X Dinh
(74) *Attorney, Agent, or Firm* — Hollingsworth Davis, LLC

(57) ABSTRACT

A slider having an air bearing surface is configured for heat-assisted magnetic recording (HAMR). The slider comprises a write pole, a near-field transducer (NFT) proximate the write pole, a return pole magnetically coupled to the write pole, and an optical waveguide configured to receive light from a light source and couple the light to the NFT. The optical waveguide comprises first and second opposing major surfaces and opposing first and second edges connected to the first and second major surfaces. An optically opaque overlay is disposed on one or both of the first and second major surfaces of the optical waveguide. The optically opaque overlay can be light reflective or light absorbing.

20 Claims, 8 Drawing Sheets

(56) References Cited

U.S. PATENT DOCUMENTS

| | | | | |
|---|---|---|---|---|
| 2012/0092971 A1* | 4/2012 | Schreck | ............... | G11B 5/314 |
| | | | | 369/13.24 |
| 2012/0170429 A1* | 7/2012 | Zhou | ................. | G11B 5/1278 |
| | | | | 369/13.33 |
| 2012/0327751 A1* | 12/2012 | Iwanabe | ............... | G11B 5/314 |
| | | | | 369/13.33 |
| 2013/0108218 A1* | 5/2013 | Weinert | ................ | G02B 6/02 |
| | | | | 385/56 |
| 2013/0288077 A1 | 10/2013 | Dhawan et al. | | |
| 2014/0313872 A1 | 10/2014 | Rawat et al. | | |

\* cited by examiner

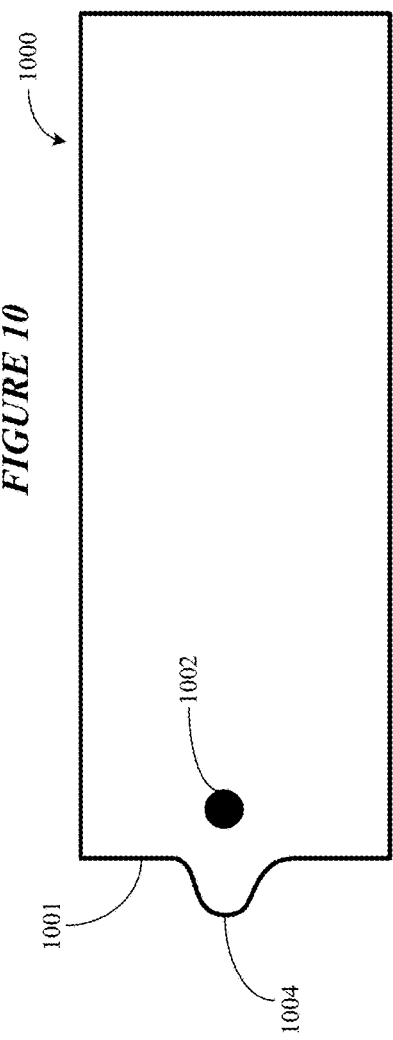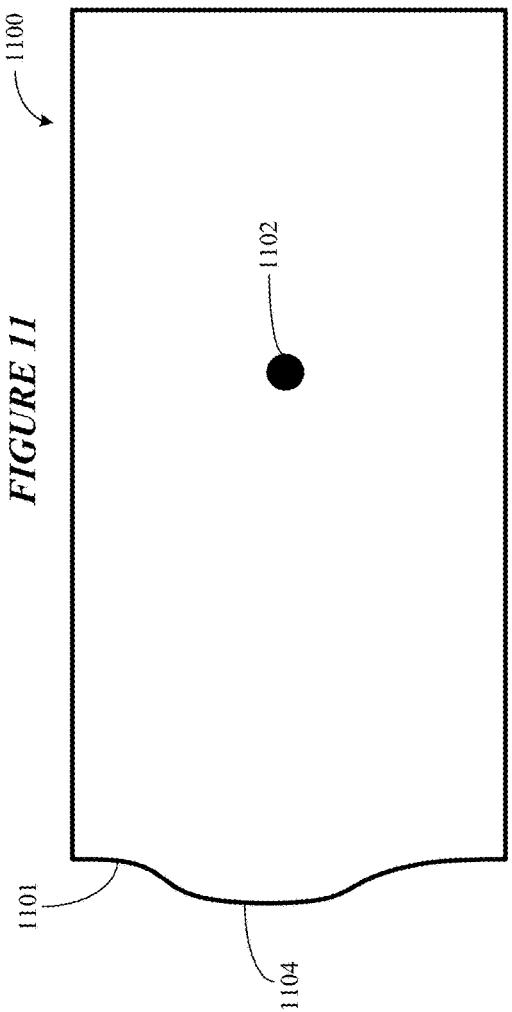

US 10,127,937 B1

OPTICALLY OPAQUE OVERLAY FOR A WAVEGUIDE OF A HEAT-ASSISTED MAGNETIC RECORDING SLIDER

RELATED PATENT DOCUMENTS

This application claims the benefit of Provisional Patent Application Ser. No. 62/301,418 filed on Feb. 29, 2016, to which priority is claimed pursuant to 35 U.S.C. § 119(e), and which is incorporated herein by reference in its entirety.

SUMMARY

Embodiments of the disclosure are directed to an apparatus comprising a slider having an air bearing surface and configured for heat-assisted magnetic recording (HAMR). The slider comprises a write pole, a near-field transducer (NFT) proximate the write pole, a return pole magnetically coupled to the write pole, and an optical waveguide configured to receive light from a light source and couple the light to the NFT. The optical waveguide comprises first and second opposing major surfaces and opposing first and second edges connected to the first and second major surfaces. An optically opaque overlay is disposed on one or both of the first and second major surfaces of the optical waveguide.

Other embodiments are directed to an apparatus comprising a HAMR slider having a write pole, a return pole magnetically coupled to the write pole, an NFT proximate the write pole, and an optical waveguide configured to receive light from a light source and couple the light to the NFT. The optical waveguide comprises an upper cladding layer adjacent the write pole, a lower cladding layer adjacent the return pole, and a core between the upper and lower cladding layers. A first optically opaque overlay is disposed on the upper cladding layer of the waveguide in contact with the write pole. A second optically opaque overlay is disposed on the lower cladding layer of the waveguide in contact with the return pole. A spacing between the first and second major surfaces is a function of mode type and mode size of the light communicated by the waveguide.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 10 shows a local protrusion at the ABS of a HAMR slider resulting from stray light heating concentrated at a situs near the ABS; and FIG. 11 shows a broad protrusion at the ABS of a HAMR slider resulting from stray light heating concentrated at a situs away from the ABS, the HAMR slider incorporating an optically opaque jacket arrangement in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
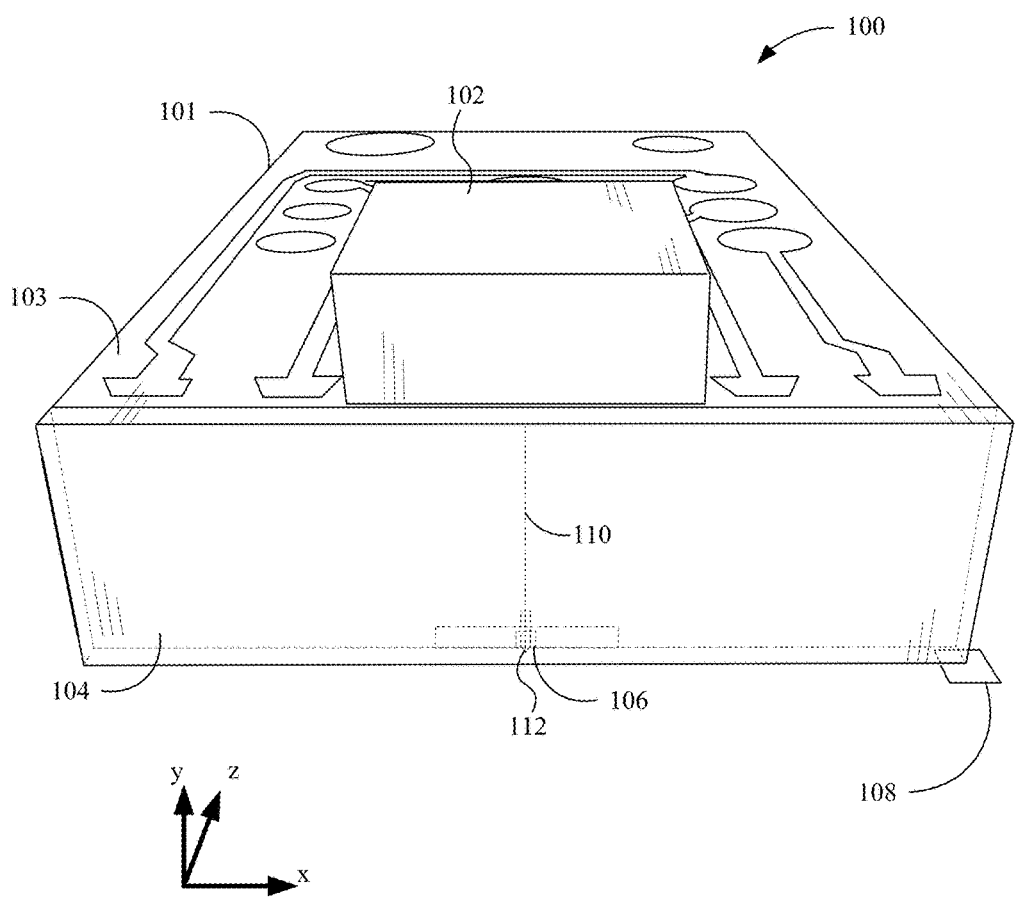
FIG. 1 is a perspective view of a HAMR slider assembly according to a representative embodiment.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide system 110, are formed integrally within the slider body 101 (near a trailing edge surface 104 in this example) and function as an optical path that delivers energy from the laser diode 102 to the recording media via an NFT 112. The NFT 112 is near the writer of the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
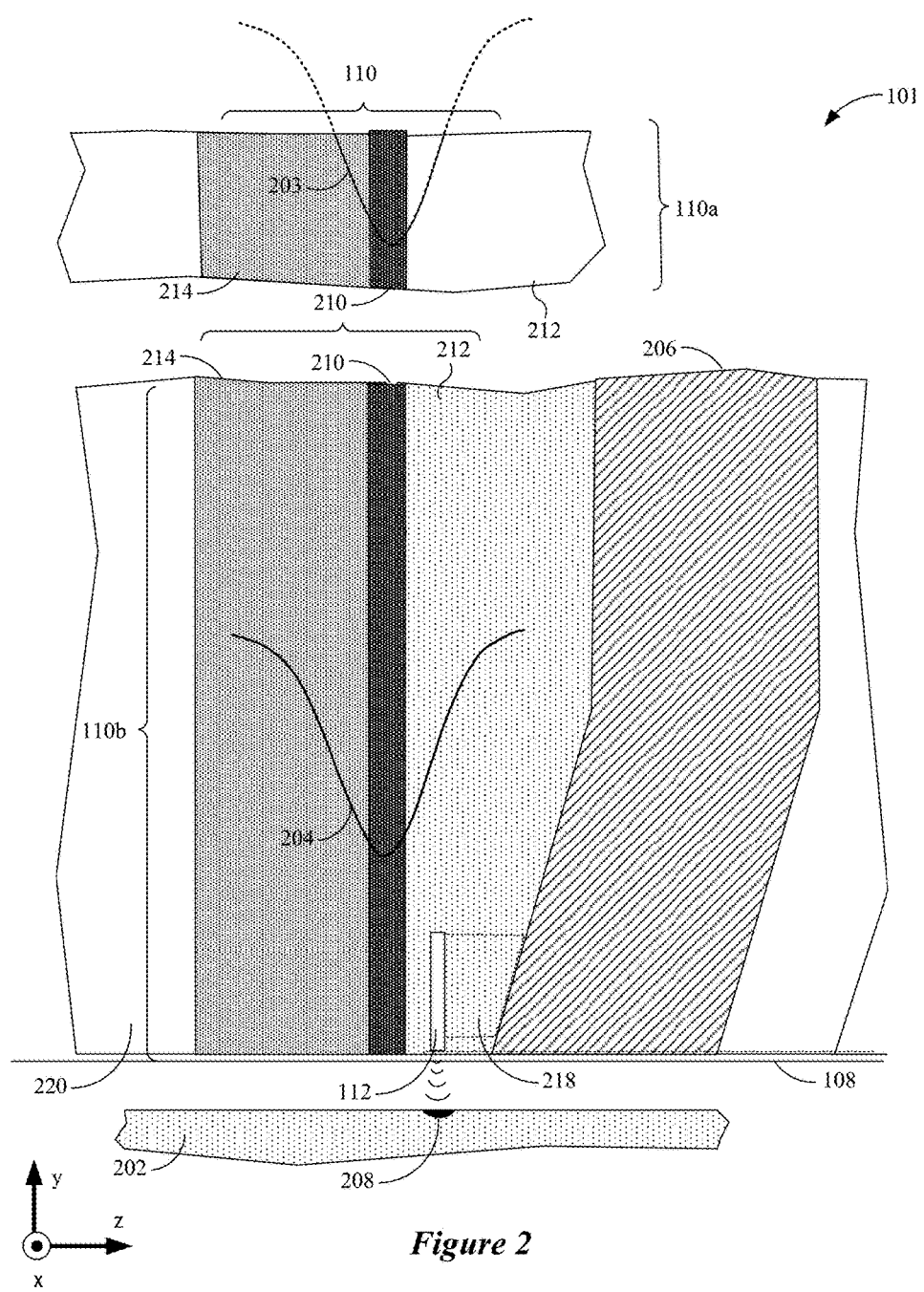
FIG. 2 is a cross-sectional view of portions of a slider body near an NFT according to a representative embodiment.

In FIG. 2, a cross-sectional view illustrates portions of the slider body 101 near the NFT 112 according to a representative embodiment. In this view, the NFT 112 is shown proximate to a surface of a magnetic recording medium 202, e.g., a magnetic disk. The waveguide system 110 delivers electromagnetic energy to the NFT 112, which directs the energy to create a small hotspot 208 on the recording medium 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

The waveguide system 110 includes a first portion 110a configured to receive light 203 from a light source (e.g., laser 102 in FIG. 2) at a fundamental transverse electric (TE) mode (e.g., TE00). The first portion 110a may include at least a three-dimensional waveguide extending along the light propagation direction (negative y-direction). The waveguide system 110 also includes a second portion 110b that outputs light 204 to an output region of the waveguide near the NFT 112 at a higher-order TE mode (e.g., TE10). A mode order converter (see, e.g., FIG. 7) can be integrated in the first or second portions 110a and 110b. Alternatively, the dimensions and relative orientation of the portions 110a-b can be selected to achieve the mode conversion of light propagated to the NFT 112. The NFT 112 receives the light 204 at the higher-order mode and generates surface plasmons that heat the magnetic recording medium 202. The NFT 112 may include or be coupled to a heat sink 218 that extends to the write pole 206.

The waveguide portions 110a-b are formed via a layer of core material 210 surrounded by cladding layers 212 and 214. The core layer 210 and cladding layers 212, 214 may be made from dielectric materials such as Al2O3, SiOxNy, SiO2, Ta2O5, TiO2, ZnS, SiNx, Nb2O5, AlN, Hf2O3, Y2O3, etc. Generally, the dielectric materials are selected so that the refractive index of the core layer 210 is higher than refractive indices of the cladding layers 212 and 214. This arrangement of materials facilitates efficient propagation of light through the waveguide system 110. While the first and second portions 110a-b are co-planar in this example, they may be offset from each other in the z-direction. For example, the cores may have different thicknesses but be centrally aligned in the z-direction. In such a case, they may be formed from different core and/or cladding layers using the same or different materials.

A portion of the laser light energy communicated to an NFT is absorbed and converted to heat within the slider. This heating results in thermal expansion of the ABS materials, protrusion at the ABS, and a change in both head-media clearance and head-media separation. Laser induced protrusion (LIP) is a persistent problem for HAMR heads. LIP can reduce areal density (e.g., from HMS effects) and negatively affect reliability (e.g., due to burnish and excessive heating of the reader and read heater). LIP can be expressed as LIWP (laser induced writer protrusion) and/or LIRP (laser induced reader protrusion).

Figure 3:
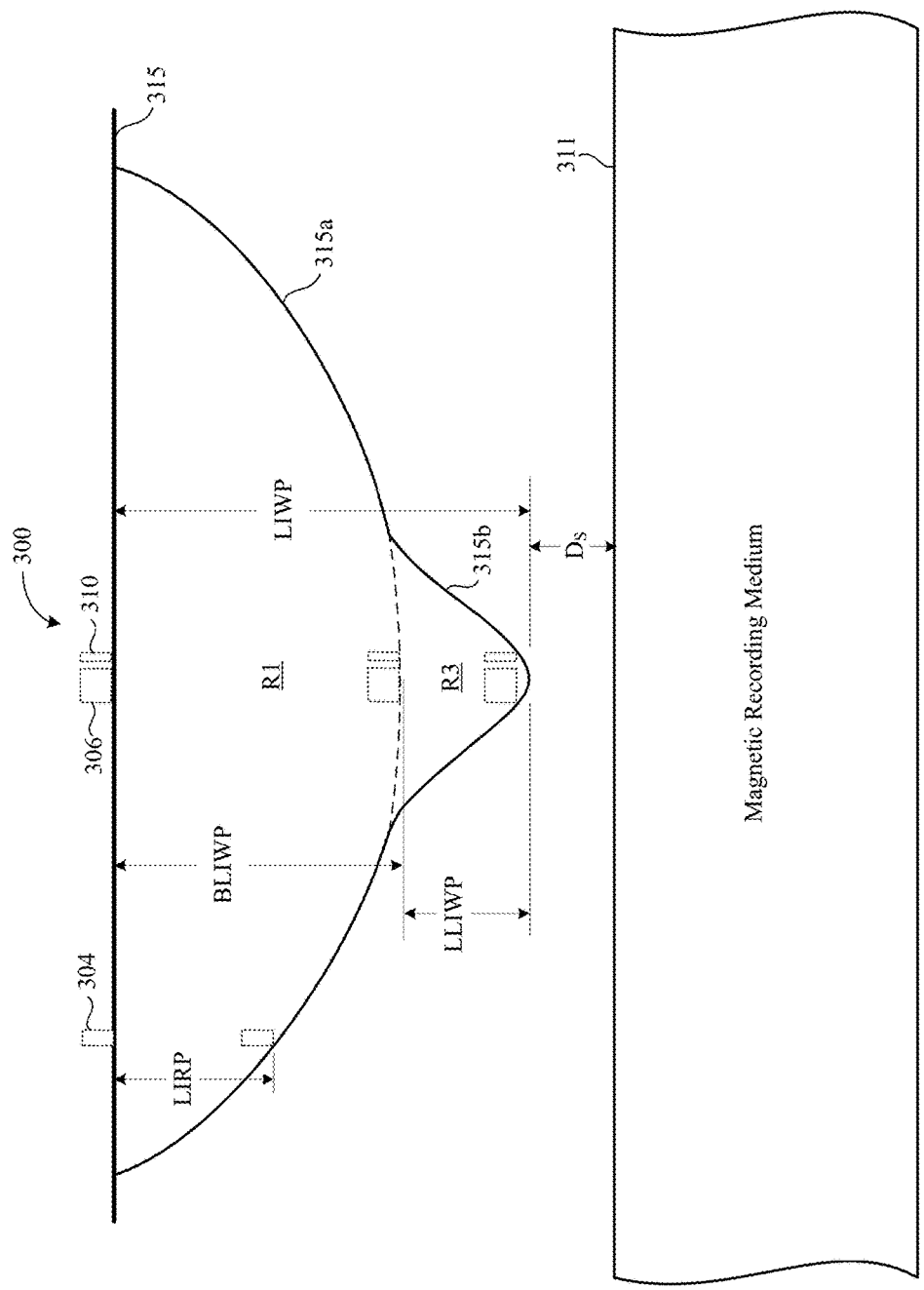
FIG. 3 is an exaggerated illustration of laser-induced protrusion at the air bearing surface (ABS) of a HAMR slider in accordance with various embodiments.

FIG. 3 is an exaggerated illustration of laser-induced protrusion at the ABS 315 of a HAMR slider 300 in accordance with various embodiments. More particularly, the protrusion of the slider ABS 315 shown in FIG. 3 is referred to herein as Laser-induced Writer Protrusion (LIWP). As is shown in FIG. 3, the region of LIWP encompasses a writer 306 and an NFT 310 of the slider. LIWP represents the full excursion of the protrusion developed at the ABS 315 due to heating of the NFT 310 by excitation of the laser and other heat sources (e.g., the writer 306 and writer heater). The reader 304 is also subject to displacement by the ABS protrusion resulting from excitation of the laser of the slider. Protrusion of the slider ABS 315 due to laser/NFT heating in the region that encompasses the reader 304 is referred to herein as Laser-induced Reader Protrusion (LIRP). Because the reader 304 is situated away from the NFT 310/writer 306, allowing for dissipation of laser-induced heat, LIRP is not as pronounced as LIWP. However, LIRP is quite noticeable and impacts reader performance. It is noted that the features shown in FIG. 3 are not drawn to scale.

LIWP is understood to include two protrusion components. The first component of LIWP is a broad protrusion component, referred to herein as Broad Laser-induced Writer Protrusion (BLIWP). As the term implies, a relatively broad region of the ABS 315 surrounding the writer 306 and NFT 310 expands to form a protruded region (volume) R1 in response to the heat generated by the NFT 310 and the writer 306 (and writer heater). The second component of LIWP is a local protrusion component, referred to herein as Local Laser-induced Writer Protrusion (LLIWP). LLIWP is a small and narrow protrusion (relative to the BLIWP) that extends from the BLIWP in a direction towards the surface of the magnetic recording medium 311. As can be seen in FIG. 3, the BLIWP component encompasses a significantly larger volume (in region R1) of ABS material relative to that (in region R3) of the LLIWP component. Evaluation of experimental sliders has revealed that LIWP typically ranges between about 3 and 4 nm, while LLIWP typically ranges between about 1 to 3 nm (<3 nm). It is understood that, although each of LIWP, BLIWP, LLIWP, and LIRP involves expansion of a volume of ABS material, these protrusion parameters are measured in terms of a distance (in nanometers) extending from the ABS 315 and along a plane normal to the ABS 315 in a direction towards the recording medium 311.

As was discussed previously, excitation of the laser causes optical energy to impinge on the NFT 310, causing significant heating at the ABS 315 in the region of the NFT 310. The heat produced by the NFT 310 and the writer 306 (and other thermal sources, such as the writer heater, reader, and reader heater) causes thermal expansion of the surrounding ABS material, resulting in the BLIWP. Heating of the NFT 310 also results in high power density in the local region immediately surrounding the NFT 310, resulting in development of the LLIWP. Although the ABS material in region R1 subject to BLIWP and that of region R3 subject to LLIWP is essentially the same, the thermal time constant of the material in region R1 and region R3 vary significantly from one another. For example, the thermal time constant of the material in region R1 (subject to BLIWP) is between about 100 and 300 μs, which is similar to that of ABS material subject to heating by the writer heater or the reader heater. The thermal time constant of the material in region R3 (subject to LLIWP) is around 1 μs or less.

Embodiments of the disclosure are directed to reducing laser induced protrusion at the ABS of a HAMR slider by incorporating one or more optically opaque overlays provided at an outer boundary of an optical waveguide of the slider. The optical waveguide can be a planar waveguide or a channel waveguide, for example. An optically opaque overlay refers to a structure that is substantially non-transmissive (e.g., a barrier) to wavelengths of light communicated along an optical waveguide of a HAMR slider. For convenience, an optically opaque overlay is referred to herein as an optically opaque jacket or simply a jacket.

Figure 4:
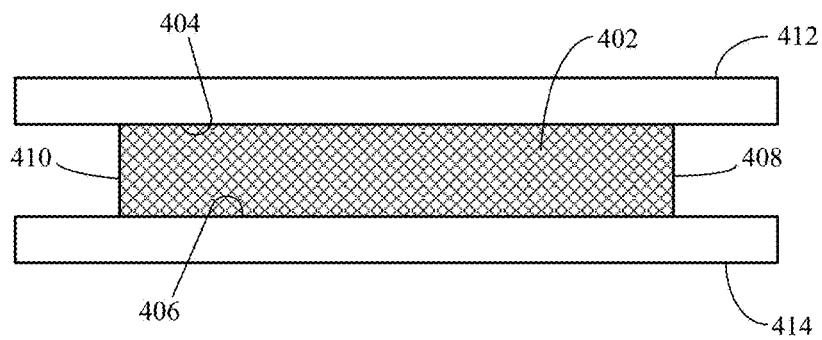
FIG. 4 illustrates a portion of a HAMR slider which includes an optical waveguide bounded by an optically opaque jacket arrangement in accordance with various embodiments.

FIG. 4 illustrates a portion of a HAMR slider which includes an optical waveguide 402 bounded by an optically opaque jacket arrangement in accordance with various embodiments. The waveguide 402 shown in FIG. 4 includes a first major surface 404 and an opposing second major surface 406. The waveguide 402 also includes opposing side surfaces 408 and 410. In the embodiment shown in FIG. 4, a first optically opaque jacket 412 is disposed on or adjacent the first major surface 404 of the waveguide 402. A second optically opaque jacket 414 is disposed on or adjacent the second major surface 406 of the waveguide 402. The first and second jackets 412 and 414 are configured to prevent light communicated along the waveguide 402 from escaping from the first and second major surfaces 404 and 406 of the waveguide 402. As will be discussed in detail hereinbelow, the optically opaque jackets 412 and 414 may be formed from light reflective material or light absorbing material.

Figure 5:
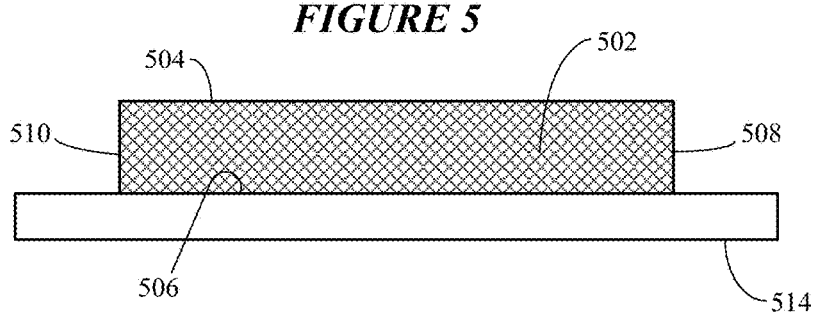
FIG. 5 illustrates a portion of a HAMR slider which includes an optical waveguide bounded by an optically opaque jacket arrangement in accordance with various embodiments.

FIG. 5 illustrates a portion of a HAMR slider which includes an optical waveguide 502 bounded by an optically opaque jacket arrangement in accordance with various embodiments. The waveguide 502 shown in FIG. 5 includes a first major surface 504, an opposing second major surface 506, and opposing side surfaces 508 and 510. In the embodiment shown in FIG. 5, only one optically opaque jacket 514 is disposed on or adjacent one of the two major surfaces 504 and 506. More particularly, optically opaque jacket 504 is disposed on or adjacent the second major surface 506 of the waveguide 502. It is noted that the waveguide 502 includes an upper cladding layer and a lower cladding layer, and that the jacket 514 can be disposed on or adjacent either the upper or lower cladding layer depending on the particular design of the HAMR slider.

Figure 6:
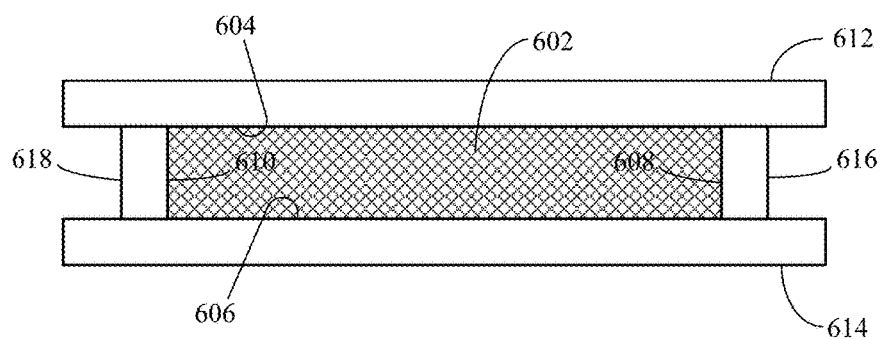
FIG. 6 illustrates a portion of a HAMR slider which includes an optical waveguide bounded by an optically opaque jacket arrangement in accordance with various embodiments.

FIG. 6 illustrates a portion of a HAMR slider which includes an optical waveguide 602 bounded by an optically opaque jacket arrangement in accordance with various embodiments. The waveguide 602 shown in FIG. 6 includes a first major surface 604, an opposing second major surface 606, and opposing side surfaces 608 and 610. In the embodiment shown in FIG. 6, a first optically opaque jacket 612 is disposed on or adjacent the first major surface 604 of the waveguide 602. A second optically opaque jacket 614 is disposed on or adjacent the second major surface 606 of the waveguide 602. A third optically opaque jacket 616 is disposed on or adjacent the first side surface 608 of the waveguide 602, and a fourth optically opaque jacket 618 is disposed on or adjacent the second side surface 610 of the waveguide 602. In FIG. 6, the optically opaque jacket arrangement encompasses the waveguide 602. In alternative embodiments, one of the first and second jackets 612 and 614 can be omitted and/or one of the third and fourth jackets 616 and 618 can be omitted.

Figure 7:
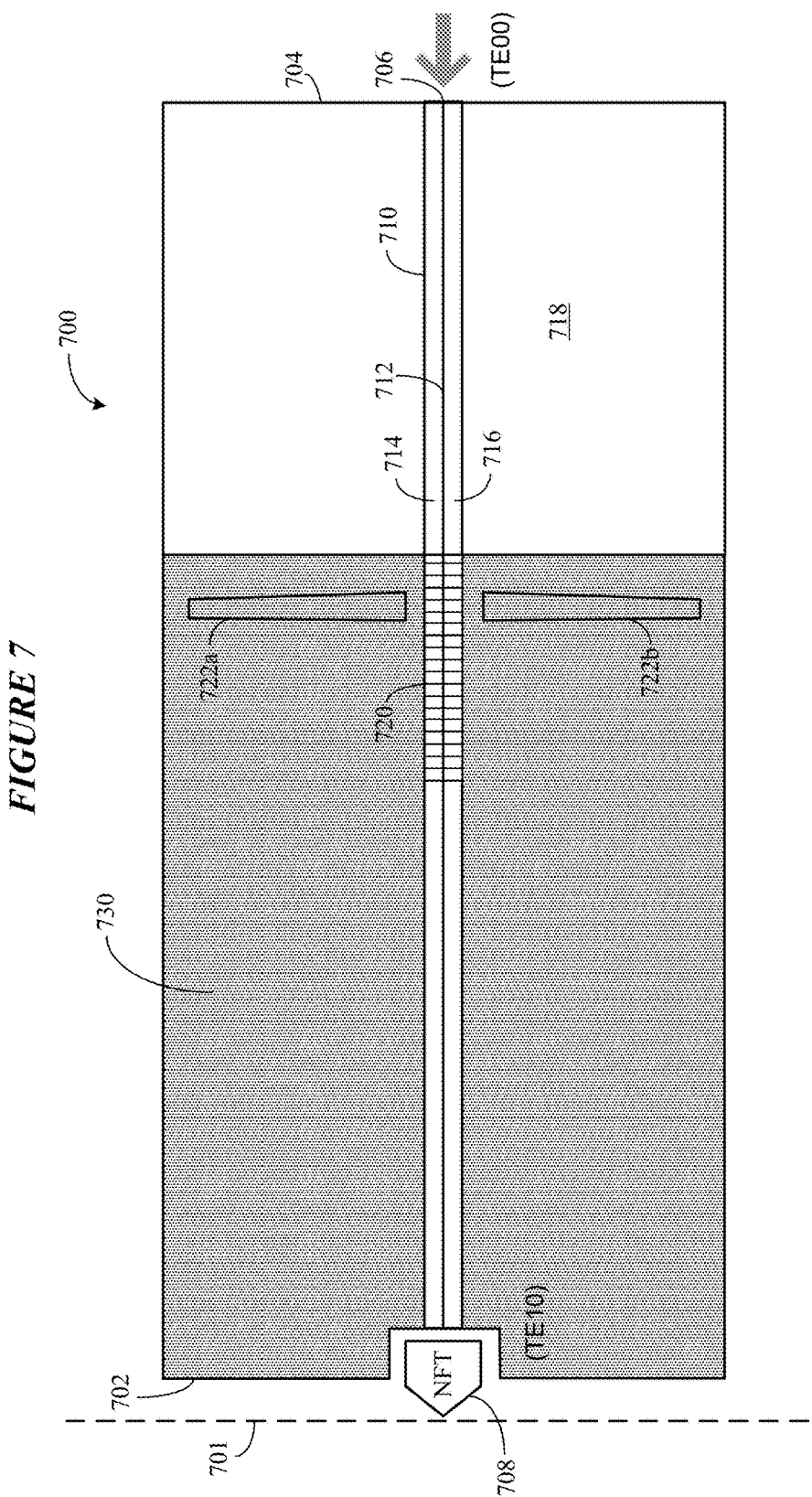
FIG. 7 illustrates a portion of a HAMR slider which includes an optical waveguide bounded by an optically opaque jacket arrangement in accordance with various embodiments.

FIG. 7 illustrates a portion of a HAMR slider which includes an optical waveguide bounded by an optically opaque jacket arrangement in accordance with various embodiments. The portion of the HAMR slider 700 shown in FIG. 7 includes an optical waveguide 710 extending between a media-facing surface 702 and a back surface 704 of the slider 700. A light input 706 to the waveguide 710 is shown at the back surface 704 of the slider 700. The waveguide 710 includes an upper cladding layer 714, a lower cladding layer 716, and a core 712 between the upper and lower cladding layers 714 and 716. The light input 706 receives light produced by a light source, such as a laser diode. An NFT 708 is situated at or near an ABS 701 of the slider 700.

The waveguide 710 communicates light received at the light input 706 to the NFT 708. The waveguide 710 includes a coupler region 718 and a mode order conversion region 720. Light barriers 722a and 722b form an aperture and serve to block light other than light communicated along the waveguide 710. According to various embodiments, the waveguide 710 is configured to receive light at a coupler region 718 emitted by the light source at a fundamental transverse electric (TE) mode (e.g., TE00). A laser diode, for example, typically has a TE00-like output beam profile.

However, a phase-shifted higher-order mode, e.g., TE10, is desired for coupling with some configurations of a plasmonic transducer, such as NFT 708. The waveguide 710 includes a mode order converter 720 which converts light from the fundamental TE mode TE00 to a higher-order TE mode (e.g., TE10). It will be understood that various embodiments may be configured to excite other higher-order modes, e.g., a TE(n, m) mode, wherein n>0 and m≥0. The light at the higher-order mode, e.g., TE10, is directed to the NFT 708 which generates surface plasmons in response. The surface plasmons are directed to heat a spot of a magnetic recording medium in proximity to the slider 700.

In FIG. 7, the waveguide 710 is bounded by an optically opaque jacket arrangement 730. In the embodiment shown in FIG. 7, the optically opaque jacket arrangement 730 extends from or proximate the ABS 701 (e.g., the media-facing surface 702) of the slider to an input of the mode order converter 720. In some embodiments, the jacket arrangement 730 has a length that extends from at or near the ABS 701 (e.g., from the media-facing surface 702) to at least about one-third of the length of the waveguide 710. In other embodiments, the jacket arrangement 730 has a length that extends from at or near the ABS 701 (e.g., the media-facing surface 702) to at least about one-half of the length of the waveguide 710. In further embodiments, the jacket arrangement 730 has a length that extends from at or near the ABS 701 (e.g., the media-facing surface 702) to at least about three-quarters of the length of the waveguide 710. In other embodiments, the jacket arrangement 730 has a length that extends from at or near the ABS 701 (e.g., the media-facing surface 702) along substantially the entire length of the waveguide 710.

The optically opaque jacket arrangement 730 is configured to prevent or inhibit light communicated along the waveguide 710 from escaping into other portions of the slider 700. Light escaping from the waveguide 710 has the undesirable effect of being absorbed by metallic structures of the slider 700 in proximity to the waveguide 710 (e.g., writer and coil structures). As a consequence, such metallic structures experience an increase in temperature which contributes to laser induced protrusion at the ABS 701. The jacket arrangement 730 prevents or inhibits light escaping from the waveguide 710 from passing through the jacket arrangement 730, thereby preventing or inhibiting heating of metallic structures proximate the waveguide 710.

In embodiments where the jacket arrangement 730 does not cover the two opposing sides of the waveguide 710, a modest amount of light can escape from the waveguide 710 and impinge on surrounding metallic structures. This minimal amount of escaping light, however, minimally or negligibly contributes to laser induced protrusion at the ABS 401. Moreover, this minimal amount of escaping light contributes to the broad laser induced protrusion component (BLIWP) rather than the local laser induced protrusion component (LLIWP). It is preferred that any escaping light contribute to BLIWP rather than LLIWP because the broader component of LIWP can be more readily compensated for than the local component of LIWP.

Figure 8:
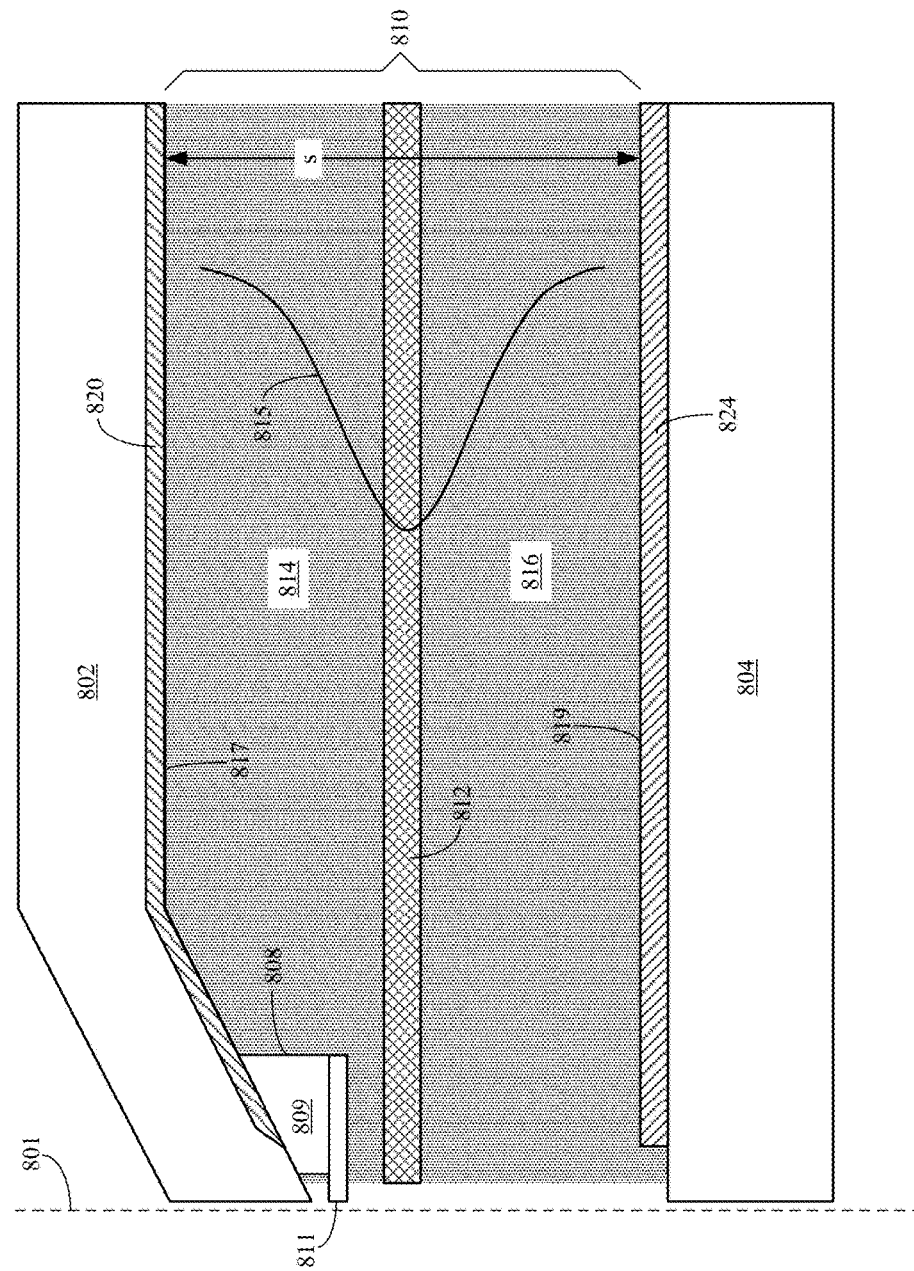
FIG. 8 illustrates a portion of a HAMR slider which includes an optical waveguide bounded by an optically opaque jacket arrangement in accordance with various embodiments.

FIG. 8 illustrates a portion of a HAMR slider which includes an optical waveguide bounded by an optically opaque jacket arrangement in accordance with various embodiments. In the embodiment shown in FIG. 8, the optically opaque jacket arrangement is formed from material that is light reflective. The portion of the HAMR slider 800 shown in FIG. 8 includes a number of components that terminate at or near an ABS 801 of the slider 800. The slider 800 includes a write pole 802 spaced apart from and magnetically coupled to a return pole 804. An NFT 808 is positioned proximate the write pole 802 and includes a heat sink 809 and a peg 811. The heat sink 809 of the NFT 808 is coupled to the write pole 802. An optical waveguide 810 is shown positioned between the write pole 802 and the return pole 804. The waveguide 810 includes an upper cladding layer 814, a lower cladding layer 816, and a core 812 disposed between the upper and lower cladding layers 814 and 816. The upper cladding layer 814 includes a first major surface 817, and the lower cladding layer 816 includes a second major surface 819.

The waveguide 810 is bounded by an optically opaque jacket arrangement which, in the embodiment shown in FIG. 8, includes a first optically opaque jacket 820 and a second optically opaque jacket 824. The first jacket 820 is disposed on or adjacent the first major surface 817 of the upper cladding layer 814. The second jacket 824 is disposed on or adjacent the second major surface 819 of the lower cladding layer 816. According to some embodiments, the first jacket 820 is an optically opaque layer formed along a length of the write pole 802, and the second jacket 824 is an optically opaque layer formed along a length of the return pole 804.

In the embodiment shown in FIG. 8, the first and second jackets 820 and 824 are formed from a light reflecting material, such as Au, Ag, Cu, or Al. The material used to form the first and second jackets 820 and 824 can be the same or different material. Stray light escaping from the waveguide 810 is scattered and diffused by the first and second jackets 820 and 824. It has been found that diffusing stray light from the waveguide 810 by the first and second jackets 820 and 824 results in heating of metallic structures proximate the waveguide 810 that contributes predominately to the broad laser induced protrusion component (BLIWP) rather than the local laser induced protrusion component (LLIWP).

The spacing, s, between the first and second jackets 820 and 824 is preferably a function of mode type and mode size of the light communicated by the waveguide 810. In the case of light at a TE00 or TE10 mode, as depicted by light 815 in FIG. 8, the light 815 has a generally Gaussian shape as viewed in cross section. The spacing, s, between the first and second jackets 820 and 824 accommodates the mode size of the light 818, such that most or all of the tail portion of the Gaussian shaped light 815 is accommodated by the jacket arrangement. For example, the first and second jackets 820 and 824 can each be spaced from the core 812 by about 300-500 nm, and the core 812 can have a width of about 100-150 nm. As such, the spacing, s, between the first and second jackets 820 and 824 can be about 700-1200 nm.

Ideally, light input to the waveguide 810 is entirely of a TE00 mode according to some embodiments, which is converted only to a TE10 mode by a mode order converter integrated within the waveguide 810. In a real waveguide 810, however, other modes can coexist or be created, such as light at a transverse magnetic (TM) mode (e.g., TM00). Light at a TE00 or TE10 mode has a polarization parallel to the jackets 820 and 824, making the jackets 820 and 824 highly reflective to TE modes. Light at a transverse magnetic mode (e.g., TM00) has a polarization perpendicular to the jackets 820 and 824, making the jackets 820 and 824 highly absorbing to TM modes. As such, the jackets 820 and 824 can be considered reducers or filters of light of transverse magnetic modes.

Figure 9:
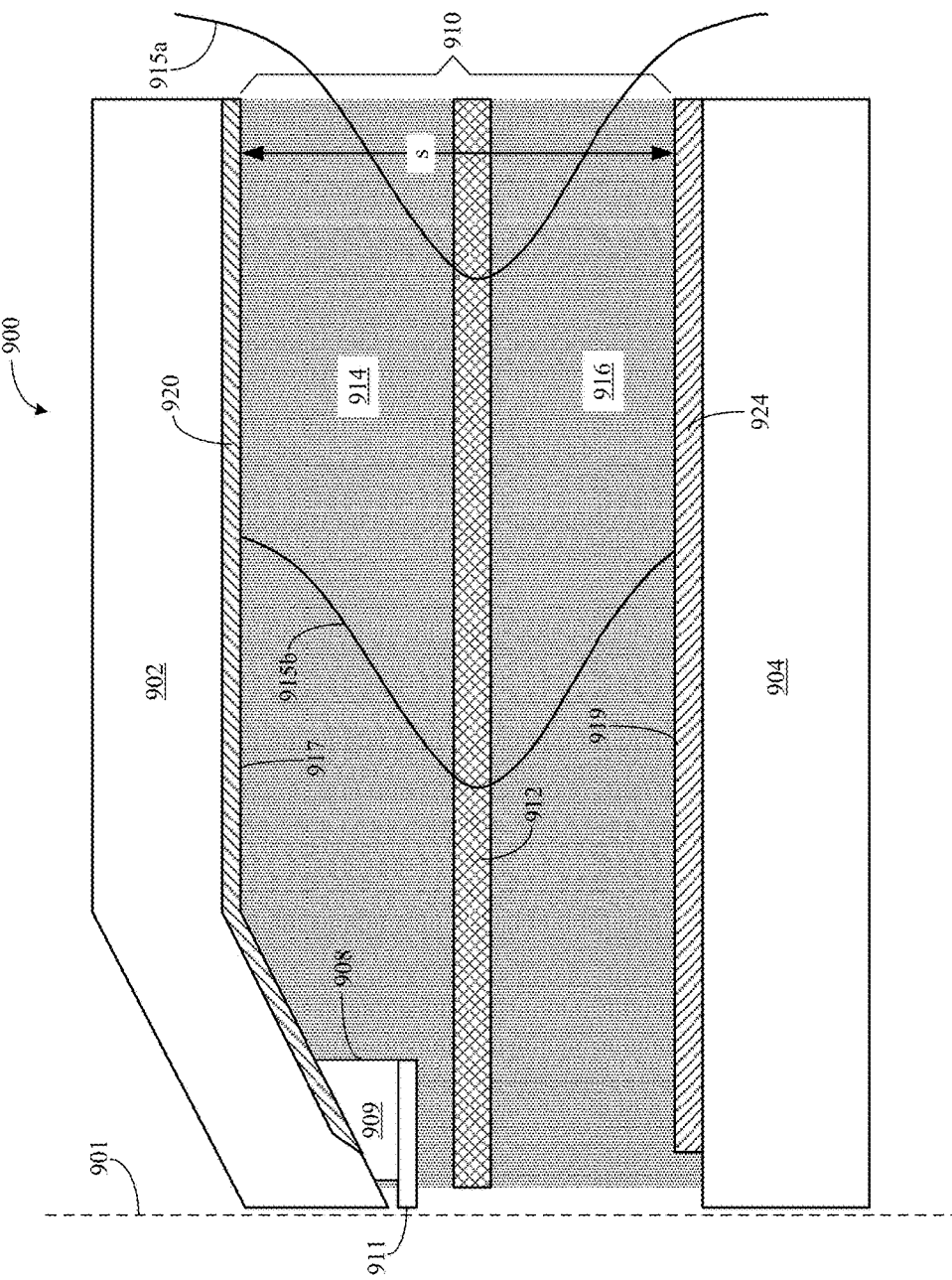
FIG. 9 illustrates a portion of a HAMR slider which includes an optical waveguide bounded by an optically opaque jacket arrangement in accordance with various embodiments.

FIG. 9 illustrates a portion of a HAMR slider which includes an optical waveguide bounded by an optically opaque jacket arrangement in accordance with various embodiments. In the embodiment shown in FIG. 9, the optically opaque jacket arrangement is formed from material that is light absorbing. The portion of the HAMR slider 900 shown in FIG. 9 includes a number of components that terminate at or near an ABS 901 of the slider 900. The slider 900 includes a write pole 902 spaced apart from and magnetically coupled to a return pole 904. An NFT 908 is positioned proximate the write pole 902 and includes a heat sink 909 and a peg 911. The heat sink 909 of the NFT 908 is coupled to the write pole 902. An optical waveguide 910 is shown positioned between the write pole 902 and the return pole 904. The waveguide 910 includes an upper cladding layer 914, a lower cladding layer 916, and a core 912 disposed between the upper and lower cladding layers 914 and 916. The upper cladding layer 914 includes a first major surface 917, and the lower cladding layer 916 includes a second major surface 919.

The waveguide 910 is bounded by an optically opaque jacket arrangement which, in the embodiment shown in FIG. 9, includes a first optically opaque jacket 920 and a second optically opaque jacket 924. The first jacket 920 is disposed on or adjacent the first major surface 917 of the upper cladding layer 914. The second jacket 924 is disposed on or adjacent the second major surface 919 of the lower cladding layer 916. According to some embodiments, the first jacket 920 is an optically opaque layer formed along a length of the write pole 902, and the second jacket 924 is an optically opaque layer formed along a length of the return pole 904.

In the embodiment shown in FIG. 9, the first and second jackets 920 and 924 are formed from a light absorbing material, such as Fe, NiFe, Cr, or W. Stray light escaping from the waveguide 910 is absorbed by the first and second jackets 920 and 924. The jacket arrangement shown in FIG. 9 is configured to be a mode filter or a mode stripper structure. The jacket arrangement allows passage of desired light modes, while undesirable light modes are filtered or stripped. More particularly, the spacing, s, between the first and second jackets 920 and 924 is selected so that the jackets 920 and 924 interact with the light 915 so that transverse magnetic modes (e.g., TM00) of the light 915 are filtered. For example, the first and second jackets 920 and 924 can each be spaced from the core 912 by about 100-300 nm, and the core 912 can have a width of about 100-150 nm. The spacing, s, between the first and second jackets 920 and 924 can be about 300-1500 nm.

FIG. 9 shows the light 915*a* entering the waveguide 910 is light at a transverse electric mode (e.g., TE00) having a generally Gaussian shape. The spacing, s, between the first and second jackets 920 and 924 is selected so that some of the tail portion of the light 915*b* is not accommodated by the jacket arrangement. Interaction between the jackets 920 and 924 and the light 915*b* results in minimal (e.g., negligible) absorption of the TE mode light and substantial absorption of the TM mode light. For example, with each of the jackets 920 and 924 spaced at about 250 nm from the core 912, about 1% of light at the TE modes is absorbed over the length of the jackets 920 and 924, whereas about 25% of light at the TM modes is absorbed.

Because stray light escaping from the waveguide 910 is absorbed by the first and second jackets 920 and 924, a reduction in laser induced protrusion at the ABS 901 is realized. More particularly, absorption of stray light by the first and second jackets 920 and 924 results in a reduction in the local laser induced protrusion (LLIWP).

FIG. 10 shows a local (narrow) protrusion 1004 at the ABS 1001 of a HAMR slider 1000 resulting from stray light heating concentrated at a situs 1002 near the ABS 1001. The waveguide of the HAMR slider 1000 in FIG. 10 does not include an optically opaque jacket arrangement. In FIG. 11, the HAMR slider 1100 incorporates an optically opaque jacket arrangement formed from light absorbing material. Because stray light is absorbed over the length of the jacket arrangement, stray light heating near the ABS 1101 is reduced. This reduction in stray light heating at or near the ABS 1101 is depicted as a translation of the heat situs 1102 from near the ABS 1101 to a location in the body of the slider 1000 spaced away from the ABS 1101. As a result, the heat situs 1102 contributes negligibly to the broad laser induced protrusion component (BLIWP), but not to the LLIWP component.

Experiments were performed to evaluate the extent to which an optically opaque jacket arrangement of the present disclosure reduces broad laser induced protrusion (BLIWP) and laser induced reader protrusion (LIRP) in a HAMR slider. A reflective jacket arrangement formed from Au and an absorptive jacket arrangement formed from W were evaluated. A HAMR slider having a reflective jacket arrangement comprising first and second jackets formed from Au was evaluated. A HAMR slider having an absorptive jacket arrangement comprising first and second jackets formed from W was also evaluated. The experiments demonstrated a 20% reduction in BLIWP and LIRP for both the reflective and absorptive jacket arrangements when compared to HAMR sliders lacking a jacket arrangement.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. An apparatus, comprising:
   a slider configured for heat-assisted magnetic recording and having an air bearing surface and an opposing back surface, the slider comprising:
   a write pole;
   a near-field transducer (NFT) proximate the write pole;
   an optical waveguide configured to receive light from a light source and couple the light to the NFT, the optical waveguide comprising an upper cladding layer, a lower cladding layer, and a core between the upper and lower cladding layers, the optical waveguide having a length defined between the air bearing surface and the back surface, and a width normal to the length;
   a return pole magnetically coupled to the write pole; and
   an optically opaque overlay disposed on or adjacent one or both of the upper cladding layer and the lower cladding layer of the optical waveguide, the optically opaque overlay situated between the write pole and the return pole, and extending across and beyond the width of the optical waveguide, wherein the optically opaque overlay is substantially non-transmissive to wavelengths of light communicated along the optical waveguide and configured to inhibit heating of metallic structures proximate the optical waveguide that contributes to laser induced protrusion at the air bearing surface.

2. The apparatus of claim 1, wherein the optically opaque overlay is disposed on or adjacent one of the upper cladding layer and the lower cladding layer of the waveguide.

3. The apparatus of claim 1, wherein the optically opaque overlay is disposed on or adjacent the upper cladding layer and the lower cladding layer of the waveguide.

4. The apparatus of claim 1, wherein:
a first optically opaque overlay is disposed on or adjacent the upper cladding layer of the waveguide in contact with the write pole; and
a second optically opaque overlay is disposed on or adjacent the lower cladding layer of the waveguide in contact with the return pole.

5. The apparatus of claim 1, wherein the optically opaque overlay is disposed on or adjacent the upper cladding layer, the lower cladding layer, and first and second edges of the waveguide.

6. The apparatus of claim 1, wherein:
the optically opaque overlay extends from at or near the air bearing surface of the slider into the slider by at least about one-third of the length of the waveguide.

7. The apparatus of claim 1, wherein:
the optically opaque overlay extends from at or near the air bearing surface of the slider into the slider by at least about one-half of the length of the waveguide.

8. The apparatus of claim 1, wherein:
the optically opaque overlay extends from at or near the air bearing surface of the slider into the slider along substantially the entire length of the waveguide.

9. The apparatus of claim 1, wherein optically opaque overlay is light reflective.

10. The apparatus of claim 1, wherein optically opaque overlay is light absorbing.

11. The apparatus of claim 1, wherein:
the optically opaque overlay is disposed on or adjacent the upper cladding layer and the lower cladding layer of the waveguide; and
a spacing between the optically opaque overlays is a function of mode type and mode size of the light communicated by the waveguide.

12. The apparatus of claim 1, wherein:
the optically opaque overlay is disposed on or adjacent the upper cladding layer and the lower cladding layer of the waveguide; and
a spacing between the optically opaque overlays facilitates communication of a transverse electric (TE) mode of the light by the waveguide and attenuation of a transverse magnetic (TM) mode of the light communicated by the waveguide.

13. An apparatus, comprising:
a slider having an air bearing surface and configured for heat-assisted magnetic recording comprising:
a write pole;
a return pole magnetically coupled to the write pole;
a near-field transducer (NFT) proximate the write pole;
an optical waveguide configured to receive light from a light source and couple the light to the NFT, the optical waveguide comprising an upper cladding layer adjacent the write pole, a lower cladding layer adjacent the return pole, and a core between the upper and lower cladding layers;
a first optically opaque overlay disposed on or adjacent the upper cladding layer of the waveguide in contact with the write pole; and
a second optically opaque overlay disposed on or adjacent the lower cladding layer of the waveguide in contact with the return pole;
wherein a spacing between the first and second optically opaque overlays is a function of mode type and mode size of the light communicated by the waveguide.

14. The apparatus of claim 13, wherein the waveguide comprises side surfaces covered with optically opaque overlays.

15. The apparatus of claim 13, wherein:
the waveguide has a length defined between the air bearing surface and an opposing end surface of the slider; and
the first and second optically opaque overlays extend from at or near the air bearing surface of the slider into the slider by at least about one-third of the length of the waveguide.

16. The apparatus of claim 13, wherein:
the waveguide has a length defined between the air bearing surface and an opposing end surface of the slider; and
the first and second optically opaque overlays extend from at or near the air bearing surface of the slider into the slider by at least about one-half of the length of the waveguide.

17. The apparatus of claim 13, wherein:
the waveguide has a length defined between the air bearing surface and an opposing end surface of the slider; and
the first and second optically opaque overlays extend from at or near the air bearing surface of the slider into the slider along substantially the entire length of the waveguide.

18. The apparatus of claim 13, wherein the first and second optically opaque overlays are light reflective.

19. The apparatus of claim 13, wherein the first and second optically opaque overlays are light absorbing.

20. The apparatus of claim 13, wherein a spacing between the first and second optically opaque overlays facilitates communication of a transverse electric (TE) mode of the light by the waveguide and attenuation of a transverse magnetic (TM) mode of the light communicated by the waveguide.

* * * * *